US012724170B2

(12) United States Patent
Wang et al.

(10) Patent No.: US 12,724,170 B2
(45) Date of Patent: Sep. 1, 2026

(54) INSPECTION SYSTEM AND METHOD

(71) Applicant: NUCTECH COMPANY LIMITED, Beijing (CN)

(72) Inventors: Weizhen Wang, Beijing (CN); Bicheng Liu, Beijing (CN); Chunguang Zong, Beijing (CN); Shangmin Sun, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 335 days.

(21) Appl. No.: 18/574,756

(22) PCT Filed: Jul. 1, 2022

(86) PCT No.: PCT/CN2022/103256
§ 371 (c)(1),
(2) Date: Dec. 28, 2023

(87) PCT Pub. No.: WO2023/280060
PCT Pub. Date: Jan. 12, 2023

(65) Prior Publication Data
US 2024/0319114 A1 Sep. 26, 2024

(30) Foreign Application Priority Data
Jul. 9, 2021 (CN) ......................... 202110777657.9

(51) Int. Cl.
*G01V 5/22* (2024.01)
*H05H 7/02* (2006.01)
(Continued)

(52) U.S. Cl.
CPC .............. *G01V 5/224* (2024.01); *G01V 5/232* (2024.01); *H05H 9/048* (2013.01);
(Continued)

(58) Field of Classification Search
None
See application file for complete search history.

(56) References Cited

U.S. PATENT DOCUMENTS 7,257,188 B2 * 8/2007 Bjorkholm ............ G01N 23/04 378/53
7,423,273 B2 * 9/2008 Clayton ................ G01V 5/234 250/358.1
(Continued)

FOREIGN PATENT DOCUMENTS

CN 1144039 C 3/2004
CN 101162205 A 4/2008
(Continued)

OTHER PUBLICATIONS

ISR received in PCT/CN2022/103256; mailed Oct. 10, 2022.
(Continued)

*Primary Examiner* — Thomas R Artman
(74) *Attorney, Agent, or Firm* — Kilpatrick Townsend & Stockton LLP

(57) ABSTRACT

An inspection system includes: a radiation source; a detector configured to detect a signal when radiation emitted by the radiation source acts on an inspected object; and a processor in communication connection with the radiation source and configured to select a periodic radiation combination corresponding to a type of the object according to the type of the object, and cause the radiation source to emit radiation to the object in the selected periodic radiation combination during the time that the object is scanned, and the periodic radiation combination is a chronological arrangement of radiation pulses output by the radiation source in each scanning period, and radiation pulses have at least two different radiation energies. The system is capable of improving adaptability and simplifying control. An inspection method is also provided.

16 Claims, 6 Drawing Sheets

(51) Int. Cl.
*H05H 7/12* (2006.01)
*H05H 9/04* (2006.01)
*H05H 7/22* (2006.01)

(52) U.S. Cl.
CPC . *H05H 2007/022* (2013.01); *H05H 2007/027* (2013.01); *H05H 2007/122* (2013.01); *H05H 2007/227* (2013.01)

(56) References Cited

U.S. PATENT DOCUMENTS

| | | | | |
|---|---|---|---|---|
| 7,636,417 | B2 * | 12/2009 | Bjorkholm | G01V 5/234 378/53 |
| 7,688,945 | B2 * | 3/2010 | Chen | G01V 5/232 378/57 |
| 7,724,869 | B2 * | 5/2010 | Wang | G01V 5/224 378/53 |
| 8,040,189 | B2 * | 10/2011 | Leek | H05H 7/00 331/82 |
| 8,263,938 | B2 * | 9/2012 | Bjorkholm | G01V 5/281 250/363.01 |
| 9,655,220 | B2 * | 5/2017 | Kang | H05G 1/10 |
| 9,772,427 | B2 * | 9/2017 | Kang | G01V 5/222 |
| 10,129,971 | B2 * | 11/2018 | Sun | G01V 5/22 |
| 10,466,382 | B2 * | 11/2019 | Cao | G01V 5/22 |
| 11,083,074 | B2 * | 8/2021 | Nighan, Jr. | H05H 7/02 |
| 12,464,632 | B2 * | 11/2025 | Kang | H05H 7/12 |
| 2007/0025505 | A1 * | 2/2007 | Bjorkholm | G01V 5/224 378/53 |
| 2007/0210255 | A1 * | 9/2007 | Bjorkholm | G01N 23/04 250/358.1 |
| 2007/0241282 | A1 * | 10/2007 | Clayton | G01T 3/00 250/358.1 |
| 2007/0286337 | A1 | 12/2007 | Wang et al. | |
| 2008/0205594 | A1 * | 8/2008 | Bjorkholm | G01V 5/281 378/53 |
| 2009/0225939 | A1 | 9/2009 | Chen et al. | |
| 2010/0231144 | A1 * | 9/2010 | Leek | H05H 9/00 315/39 |
| 2015/0342014 | A1 | 11/2015 | Kang et al. | |
| 2016/0103241 | A1 * | 4/2016 | Kang | G01V 5/222 378/57 |
| 2016/0135278 | A1 * | 5/2016 | Sun | H05H 9/048 378/57 |
| 2017/0090062 | A1 | 3/2017 | Cao et al. | |
| 2017/0265291 | A1 * | 9/2017 | Nighan, Jr. | H05H 7/02 |
| 2024/0319112 | A1 * | 9/2024 | Liu | G01N 23/04 |
| 2024/0319114 | A1 * | 9/2024 | Wang | G01V 5/224 |
| 2024/0334585 | A1 * | 10/2024 | Kang | H05H 7/12 |

FOREIGN PATENT DOCUMENTS

| | | | |
|---|---|---|---|
| CN | 201242531 | Y | 5/2009 |
| CN | 1995993 | B | 7/2010 |
| CN | 101971055 | A | 2/2011 |
| CN | 102105815 | A | 6/2011 |
| CN | 101470084 | B | 12/2011 |
| CN | 103339657 | A | 10/2013 |
| CN | 203416494 | U | 1/2014 |
| CN | 103226114 | B | 9/2015 |
| CN | 105203569 | A | 12/2015 |
| CN | 105277578 | A | 1/2016 |
| CN | 108398444 | A | 8/2018 |
| CN | 108445546 | A | 8/2018 |
| CN | 113238293 | A | 8/2021 |
| CN | 113238298 | A | 8/2021 |
| CN | 113281821 | A | 8/2021 |
| EP | 3816615 | A1 | 5/2021 |
| WO | 2008046260 | A1 | 4/2008 |
| WO | 2009027667 | A2 | 3/2009 |
| WO | 2009106815 | A2 | 9/2009 |
| WO | 2012104740 | A1 | 8/2012 |
| WO | 2014117636 | A2 | 8/2014 |

OTHER PUBLICATIONS

Written Opinion of Isa for PCT/CN2022/103256; mailed Oct. 10, 2022.
First OA received in 202110777657.9; mailed Dec. 7, 2021.
Second OA received in 202110777657.9; mailed Apr. 14, 2022.
Third OA received in 202110777657.9; mailed Jul. 27, 2022.
Fourth OA received in 202110777657.9; mailed May 11, 2023.
Notice of Allowance received in 202110777657.9; mailed Sep. 6, 2023.
Rejection Decision received in 202110777657.9; mailed Dec. 21, 2022.
The Extended European Search Report issued in European corresponding application No. 22836811.4 mailed on Jun. 3, 2025, 8 pages.

* cited by examiner

INSPECTION SYSTEM AND METHOD

CROSS-REFERENCES TO RELATED APPLICATIONS

The present disclosure is a national phase application of International Application No. PCT/CN2022/103256, filed on Jul. 1, 2022, which claims priority to Chinese Application No. 202110777657.9, filed on Jul. 9, 2021, the entireties of which are herein incorporated by reference.

FIELD

The present disclosure relates to the field of radiation inspection, in particular to an inspection system and method.

BACKGROUND

In some related technologies, a container inspection system and a vehicle inspection system respectively aim at different types of inspected objects, and are equipped with specific ray sources. For example, the container inspection system adopts a ray source having a higher ray energy, while the vehicle inspection system for passenger vehicles adopts a ray source having a lower ray energy. In some other related technologies, the inspection system has two different ray sources. When a vehicle is inspected, different parts of the vehicle are recognized, and different ray sources are selected for different parts.

SUMMARY

The inventor found through researches that an inspection system equipped with a specific ray source has poor adaptability for an inspected object, while an inspection system having two different ray sources is complex in controlling since different portions of an object need to be recognized to select a ray source.

In view of this, embodiments of the present disclosure provide an inspection system and method capable of improving adaptability and simplifying control.

One aspect of the present disclosure provides an inspection system, including: a radiation source; a detector configured to detect a signal when radiation emitted by the radiation source acts on an inspected object; and a processor in communication connection with the radiation source and configured to select a periodic radiation combination corresponding to a type of the object according to the type of the object, and cause the radiation source to emit radiation to the object in the selected periodic radiation combination during the time that the object is scanned, and the periodic radiation combination is a chronological arrangement of radiation pulses output by the radiation source in each scanning period, and radiation pulses have at least two different radiation energies.

In some embodiments, the at least two different radiation energies include a first radiation energy and a second radiation energy, the first radiation energy is less than 1 MeV, and the second radiation energy is greater than 1 MeV.

In some embodiments, in radiation pulses included in periodic radiation combinations corresponding to each of different types, the numbers of radiation pulses having the first radiation energy are different.

In some embodiments, the at least two different radiation energies further include a third radiation energy, and the third radiation energy is greater than the second radiation energy.

In some embodiments, in radiation pulses included in the periodic radiation combinations corresponding to each of different types, the numbers of the radiation pulses having the second radiation energy and/or the numbers of the radiation pulses having the third radiation energy are different.

In some embodiments, the object is a vehicle, the type of the object includes one of a passenger car type and a truck type, and the number of radiation pulses having the first radiation energy in the periodic radiation combination corresponding to the passenger car type is greater than the number of radiation pulses having the first radiation energy in the periodic radiation combination corresponding to the truck type.

In some embodiments, the processor is configured to cause the radiation source to scan an entirety of the object in the selected periodic radiation combination.

In some embodiments, the radiation source includes: an electronic beam generating device configured to generate electronic beams; a microwave generating device configured to generate a microwave; a microwave circulator having a power input port and at least two power output ports, the power input port being connected with the microwave generating device through a waveguide structure; accelerating tubes connected with the electronic beam generating device, respectively connected with the at least two power output ports, configured to respectively receive electronic beams generated by the electronic beam generating device, and accelerate electronic beams respectively through microwaves received from the at least two power output ports, and to respectively generate radiation pulses having different radiation energies; and a controller in signal connection with the processor, the electronic beam generating device and the microwave generating device and configured to perform, according to instructions of the processor, chronological control on microwave power of the microwave generating device, and chronological control on beam loadings generated by the electronic beam generating device and respectively corresponding to electronic beams of accelerating tubes.

In some embodiments, the radiation source includes: a first electronic gun configured to generate a first electronic beam; a first electronic gun power source in signal connection with the controller and connected with the first electronic gun and configured to adjust a beam loading of the first electronic beam according to a chronological control signal provided by the controller; a second electronic gun configured to generate a second electronic beam; and a second electronic gun power source in signal connection with the controller and connected with the second electronic gun and configured to adjust a beam loading of the second electronic beam according to a chronological control signal provided by the controller, and the controller is configured to cause the first electronic gun power source to adjust the beam loading of the first electronic beam to be a first beam loading at a first time period in each period of at least one period, and cause the second electronic gun power source to adjust the beam loading of the second electronic beam to be a second beam loading at a second time period in each period, and the first time period does not coincide with the second time period.

In some embodiments, at least two power output ports of the microwave circulator include a first power output port and a second power output port, the first power output port is allocated with a microwave signal fed from the power input port, and the second power output port is allocated with a microwave signal fed from the first power output port;

and accelerating tubes include: a first accelerating tube connected with the first power output port and the first electronic gun and configured to accelerate the first electronic beam through a first output microwave signal output by the first power output port; and a second accelerating tube connected with the second power output port and the second electronic gun and configured to accelerate the second electronic beam through a second output microwave signal output by the second power output port.

In some embodiments, at least two power output ports of the microwave circulator further include a third power output port which is allocated with a microwave signal fed from the second power output port; and the radiation source further includes: an absorbing load connected with the third power output port and configured to absorb a microwave signal output by the third power output port.

In some embodiments, the microwave circulator includes a four-port circulator.

In some embodiments, the controller is configured to allow a microwave signal fed by the microwave generating device to the power input port of the microwave circulator to include at least one first input microwave signal at the first time period, and to allow the microwave signal fed by the microwave generating device to the power input port of the microwave circulator to include at least one second input microwave signal at the second time period, and a power of the at least one first input microwave signal is greater than that of the at least one second input microwave signal.

In some embodiments, the microwave generating device includes a magnetron.

In some embodiments, the inspection system further includes: an optical sensing element in communication connection with the processor and configured to sense an object feature of the object and send the object feature of the object to the processor, and the processor determines the type of the object according to the object feature; or a human-machine interaction device in communication connection with the processor and configured to receive an input type information and send the input type information to the processor, and the processor determines the type of the object according to the type information.

In some embodiments, the detector is a dual-energy detector in communication connection with the processor, the dual-energy detector includes a high-energy detector array and a low-energy detector array, the low-energy detector array is configured to detect signals when the radiation pulses having the first radiation energy emitted by the radiation source act on the object, and the high-energy detector array is configured to detect signals when the radiation pulses having the second radiation energy and the radiation pulses having the third radiation energy emitted by the radiation source act on the object.

One aspect of the present disclosure provides an inspection method of the above inspection system, including: obtaining a type of an inspected object; selecting a periodic radiation combination corresponding to the type in response to the type, and the periodic radiation combination is a chronological arrangement of radiation pulses output by the radiation source in each scanning period, and radiation pulses have at least two different radiation energies; causing the radiation source to emit radiation to the object in the selected periodic radiation combination during the time that the object is scanned; and causing the detector to detect a signal when the radiation acts on the object.

In some embodiments, the step of obtaining a type of an inspected object includes: determining the type of the object according to an object feature in response to the object feature sensed by the optical sensing element; or determining the type of the object according to type information in response to the type information input to the human-machine interaction device.

Therefore, according to embodiments of the present disclosure, after obtaining the type of the inspected object, the object is scanned according to the periodic radiation combination corresponding to the type, and the radiation source can reasonably select a proper scanning energy based on the type of the object, to scan inspection for different objects has good adaptability. Moreover, it is not necessary to recognize different parts of the object when this method is adopted, and to select radiation energy according to the different parts, to further simplify control.

BRIEF DESCRIPTION OF THE DRAWINGS

The accompanying drawings, which form part of the description, illustrate embodiments of the present disclosure and together with the description, serve to explain the principles of the present disclosure.

The present disclosure can be more clearly understood from the following detailed descriptions with reference to the accompanying drawings, in which.

It should be understood that the dimensions of various parts shown in the accompanying drawings are not drawn according to an actual scale relationship. In addition, the same or similar reference signs indicate the same or similar components.

DETAILED DESCRIPTION OF THE DISCLOSURE

Various exemplary embodiments of the present disclosure will now be described in detail with reference to the accompanying drawings. The descriptions of the exemplary embodiments are merely illustrative and are in no way intended to limit the present disclosure, and application or uses thereof. The present disclosure can be implemented in many different forms and is not limited to the embodiments described herein. These embodiments are provided, and the present disclosure will be thorough and complete, and will fully convey the embodiments of the present disclosure. It should be noted that unless otherwise specified, the relative arrangement of components and steps, the composition of materials, numerical expressions and numerical values set forth in these embodiments should be interpreted as merely illustrative and not as limitative.

Similar words of "first", "second" and the like used in the present disclosure do not indicate any order, quantity or importance, but are only used to distinguish different parts. Similar words such as "including" or "comprising" mean that the elements before the word cover the elements listed after the word, without excluding the possibility of covering other elements. "Upper", "lower", "left", "right" and the like are only used to indicate a relative positional relationship. After the absolute position of a described object changes, the relative positional relationship may also change accordingly.

In the present disclosure, when it is described that a specific device is located between a first device and a second device, there may be an intervening device between the specific device and the first device or the second device or not. When it is described that the specific device is connected to other devices, the specific device may be directly connected to the other devices without the intervening device, and may also have the intervening device without being directly connected to the other devices.

All terms (including technical terms or scientific terms) used in the present disclosure have the same meanings to which the present disclosure belongs, unless otherwise defined particularly. It should also be understood that the terms defined in, for example, general dictionaries should be interpreted as having the meanings consistent with their meanings in the context of the related art, and should not be interpreted in an idealized or extremely formal sense unless explicitly defined herein.

The related art may not be discussed in detail, but the technologies, methods and equipment should be regarded as part of the description under appropriate circumstances.

Figure 1:
FIG. 1 is a structural schematic diagram according to some embodiments of an inspection system in the present disclosure.

FIG. 1 is a structural schematic diagram according to some embodiments of an inspection system in the present disclosure. Referring to FIG. 1, in some embodiments, the inspection system includes: a radiation source 10, a detector 30 and a processor 20. The inspection system herein is applicable to inspection of objects under application scenarios (e.g., vehicle inspection, ore grade inspection, food inspection, solid waste inspection and industrial inspection), such as vehicle inspection in the scenario of vehicle inspection. The vehicle herein includes various types of motor vehicles (e.g., cars, buses, vans, container trucks) or trains (e.g., passenger trains or freight trains).

With vehicles as an example, during inspection, the vehicle can move relative to a radiation source. In some embodiments, the radiation source keeps stationary, and the inspected vehicle moves through its own power or is driven to move by other mechanisms. In some other embodiments, the inspected vehicle keeps stationary, and the radiation source moves through its own power or is driven to move by other mechanisms.

The radiation source 10 can generate radiation pulses having different radiation energies. Correspondingly, periodic radiation combinations can be achieved. In some embodiments, the radiation source 10 can include radiation sources, that is, in a multiple-source form, and each radiation source can respectively output radiation pulses having different energies. In some other embodiments, the radiation source 10 can include a single radiation source, that is, in a single-source form, and the single radiation source can output radiation pulses of different energies. The radiation pulse can be an X-ray pulse, and can also be a gamma-ray pulse, etc.

The detector 30 is configured to detect a signal when the radiation emitted by the radiation source 10 acts on an inspected object. In some embodiments, the detector 30 can be arranged on an opposite side of the radiation source 10. For example, when the radiation source 10 emits an X-ray pulse, the X-ray is attenuated after penetrating through the inspected object and is detected by the detector 30 located on the other side, to form a detection signal. An image reflecting contents inside the object can be drawn according to the detection signal.

The processor 20 is in communication connection with the radiation source 10, and is configured to select a periodic radiation combination corresponding to a type of the object according to the type of the object and cause the radiation source 10 to emit radiation to the object in the selected periodic radiation combination during the time that the object is scanned. The periodic radiation combination herein refers to a chronological arrangement of radiation pulses output by the radiation source 10 in each scanning period, and radiation pulses have at least two different radiation energies.

Before detecting the object, the processor can receive the type of the object manually input by an operator, and can also obtain related information of the object by cooperating with other elements, to determine the type of the object. Different object types have different features, and have different requirements on different factors such as radiation dosage and imaging effect.

For example, for passenger cars such as buses, the radiation dosage should be ensured not to exceed security requirement that human body can bear or requirements stipulated by laws, as long as basic imaging effects are satisfied. While for trucks such as container trucks, when a driver has already left the vehicle or a cab has been shielded from radiation, a higher radiation energy should be adopted for scanning, to obtain a better imaging effect, moreover, adaptive radiation inspection on different types of inspected objects can also be satisfied through a combination of radiation pulses having different radiation energies.

Figure 2:
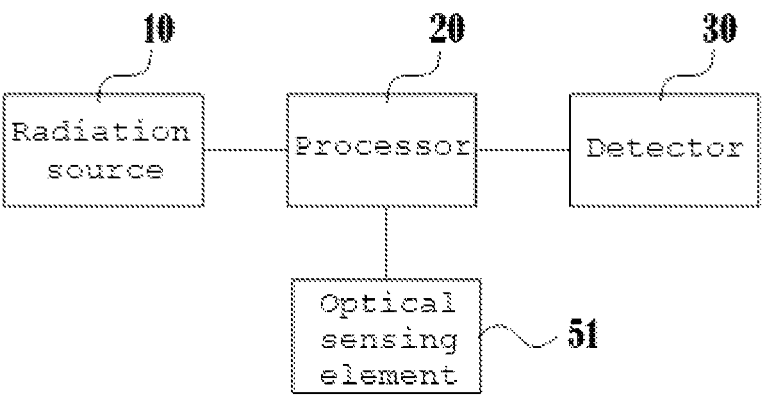
FIG. 2 is a structural schematic diagram according to some other embodiments of an inspection system of the present disclosure.

FIG. 2 is a structural schematic diagram according to some other embodiments of an inspection system of the present disclosure. Referring to FIG. 2, in some embodiments, the inspection system further includes an optical sensing element 51 in communication connection with the processor 20. The optical sensing element 51 is configured to sense an object feature of the object and send it to the processor 20, and the processor 20 determines the type of the object according to the object feature. The optical sensing element 51 can include a camera, a photoelectric switch, a laser sensor, an infrared detector and a light curtain sensor. For example, when the inspected object is a vehicle, the object features can include vehicle contour features, —specific marking of vehicle, signals emitted by a device mounted or carried on the vehicle for identifying the type, etc.

Figure 3:
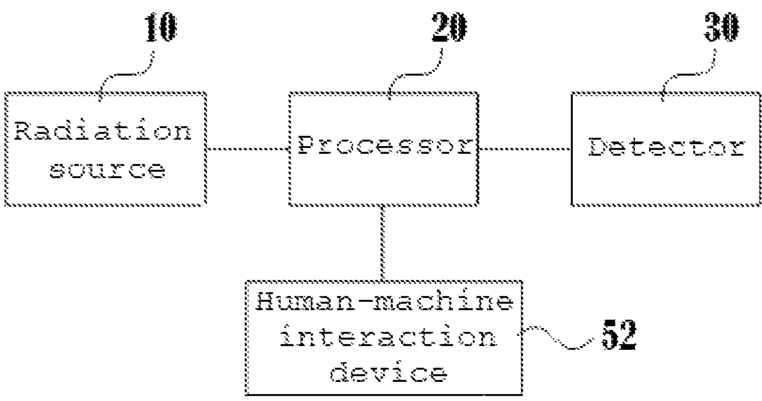
FIG. 3 is a structural schematic diagram according to still some embodiments of an inspection system of the present disclosure.

FIG. 3 is a structural schematic diagram according to still some embodiments of an inspection system of the present disclosure. Referring to FIG. 3, in some embodiments, the inspection system further includes a human-machine interaction device 52 in communication connection with the processor 20. The human-machine interaction device 52 is configured to receive an input type information and send it to the processor 20, and the processor 20 determines the type of the object according to the type information. The human-machine interaction device 52 can include a mouse, a keyboard, a touch screen, a remote control, etc.

In some other embodiments, the inspection system can not only include an optical sensing element 51, but also include a human-machine interaction device 52, and the system can optionally receive information provided by the optical sensing element 51 and/or the human-machine interaction device 52, to determine the type of the object.

At least two different radiation energies achievable by the radiation source include a first radiation energy and a second radiation energy. The first radiation energy is less than 1 MeV, for example, 225 keV, 300 keV, 450 keV, etc. The second radiation energy is greater than 1 MeV, for example, 3 MeV, 4 MeV, 6 MeV, etc. In some embodiments, at least two different radiation energies further include a third radiation energy, and the third radiation energy is greater than the second radiation energy. For example, the second radiation energy and the third radiation energy can be 3 MeV and 6 MeV, 4 MeV and 6 MeV, 4 MeV and 7 MeV, or 6 MeV and 9 MeV. The ray pulses having different radiation energies can serve as backup rays for improving penetrating power under different mass thickness conditions.

For different object types, different periodic radiation combinations can be provided according to features of objects. For example, in radiation pulses included in the periodic radiation combinations corresponding to each of different types, the numbers of radiation pulses having the first radiation energy can be different. For some objects of certain types, an increase in the number of radiation pulses having the first radiation energy within each period can increase safety of radiation and reduce unnecessary energy loss. Moreover, an increase in the radiation pulse having the first radiation energy can also reduce the spacing of each scanned cross section in a period, to obtain richer information of inspected objects and cause no greater pressure to radiation protection.

For some other types of objects, it is difficult for the radiation pulse having the first radiation energy to penetrate through materials of the object, so ideal scanned images cannot be obtained, and correspondingly the number of radiation pulses having the second radiation energy and/or the number of radiation pulses having the third radiation energy are/is increased in each period, to improve the scanning effect through the radiation pulses having a higher radiation energy.

For example, in radiation pulses included in the periodic radiation combinations corresponding to each of different types, the numbers of radiation pulses having the second radiation energy and/or the number of radiation pulses having the third radiation energy can be different. For the part with a larger mass thickness in the inspected object, richer classified information can be obtained through alternate scanning of the third radiation pulse and the second radiation pulse, for example, a classification of organic substances, inorganic substances and mixtures can be obtained through alternate scanning of a radiation pulse of 3 MeV and a radiation pulse of 6 MeV, or a classification of organic substances, inorganic substances, mixtures and heavy metals can be obtained through alternate scanning of a radiation pulse of 6 MeV and a radiation pulse of 9 MeV. Correspondingly, different numbers of radiation pulses having the second radiation energy and radiation pulses having the third radiation energy can be set in the periodic radiation combination, to satisfy scanning requirements of different types of objects.

In some embodiments, the object is a vehicle, and the type of the object may include one of a passenger car type and a truck type. The number of radiation pulses having the first radiation energy in the periodic radiation combination corresponding to the passenger car type is greater than the number of radiation pulses having the first radiation energy in the periodic radiation combination corresponding to the truck type. In some embodiments, for vehicles, the types of objects may be further subdivided, e.g., the types of objects may include a passenger car, a bus, a van, a container truck, a passenger train, a freight train, and may also include a vehicle type distinguished by carried objects, e.g., a passenger car, an agricultural truck, and a fuel truck. Different types of vehicles may correspond to different periodic radiation combinations.

In the above embodiments, the processor 20 can be configured to scan an entirety of the object by the radiation source 10 in the selected periodic radiation combination. In other words, the processor 20 does not need to switch periodic radiation combinations in the scanning process of an entirety of the object, to effectively reduce controlling difficulty.

FIG. 4 to FIG. 7 are respectively schematic diagrams of periodic radiation combinations adopted for different vehicle types according to some embodiments of the inspection system of the present disclosure. In FIG. 4 to FIG. 7, E represents the radiation energy of radiation pulse, and t represents the time at which each cross section of a vehicle is scanned. An arrow refers to the chronological arrangement of radiation pulses output by the radiation source within one scanning period (IT), that is, a periodic radiation combination. Suppose that the scanning speed (that is, a relative moving speed of the inspection system and the inspected vehicle) is 0.4 m/s, the beam exit frequency of the ray source is 80 Hz, then the spacing of each scanned cross section of the inspected object is calculated to be 5 mm.

Figure 4:
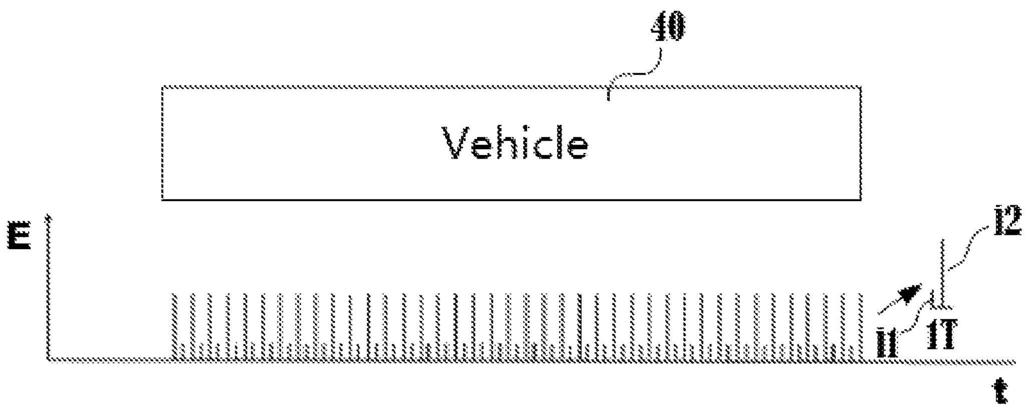
FIG. 4 to FIG. 7 are respectively schematic diagrams of periodic radiation combinations adopted for different vehicle types according to some embodiments of the inspection system of the present disclosure.
Figure 5:
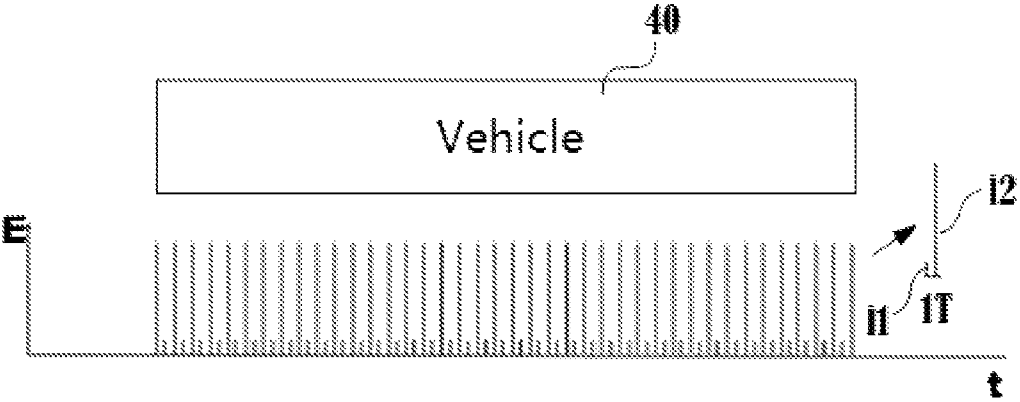

In FIG. 4, for a vehicle 40 (for example, the type of the vehicle is a small truck), the periodic radiation combination has two different radiation energies, which are respectively radiation pulse i1 of 300 keV and radiation pulse i2 of 3 MeV. In FIG. 5, for a vehicle 40 (for example, the type of the vehicle is a medium truck), the periodic radiation combination also has two different radiation energies, which are respectively radiation pulse i1 of 300 keV and radiation pulse i2 of 6 MeV. Compared with FIG. 4, the radiation pulse i2 corresponding to the vehicle in FIG. 5 has a higher radiation energy and a stronger penetrating capability, to obtain a better scanned image quality.

Figure 6:
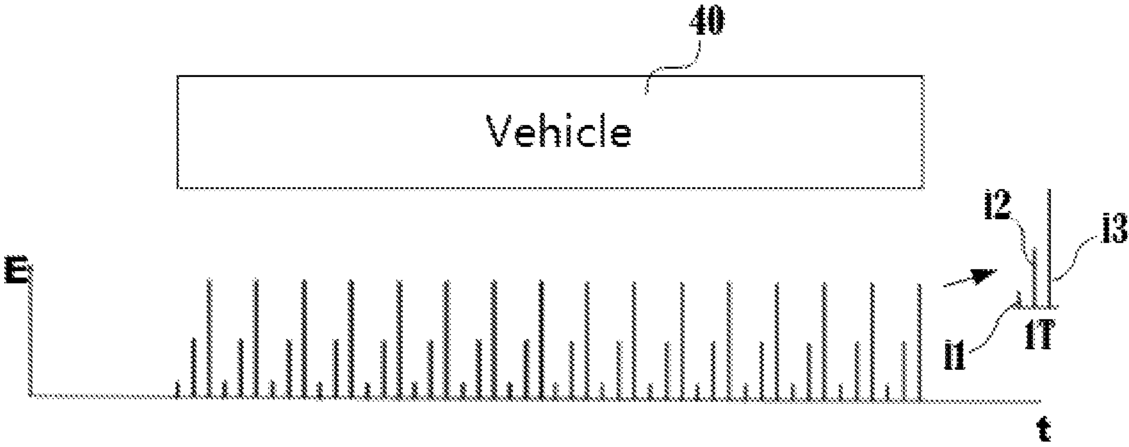
Figure 7:
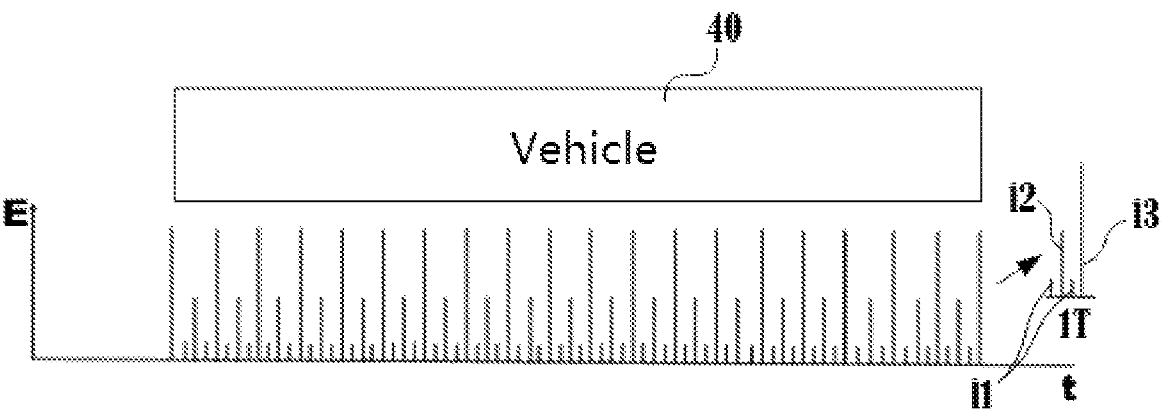

In FIG. 6, for the vehicle 40 (e.g., the vehicle type is a large truck), the periodic radiation combination has three different radiation energies, which are respectively radiation pulse i1 of 300 keV, radiation pulse i2 of 3 MeV and radiation pulse i3 of 6 MeV. In FIG. 7, for the vehicle 40 (e.g., the vehicle type is a container truck), the periodic radiation combination also has three different radiation energies, which are respectively radiation pulse i1 of 300 keV, radiation pulse i2 of 3 MeV and radiation pulse i3 of 6 MeV. Compared with FIG. 6, the number of radiation pulse i1 in the periodic radiation combination in FIG. 7 is greater. In this way, on one hand, richer material classified information can be obtained through alternate scanning of the radiation pulse i2 and the radiation pulse i3, and on the other hand, the spacing of each scanned cross section in each period is reduced through more radiation pulses i1, and the radiation protection pressure is reduced.

Figure 8:
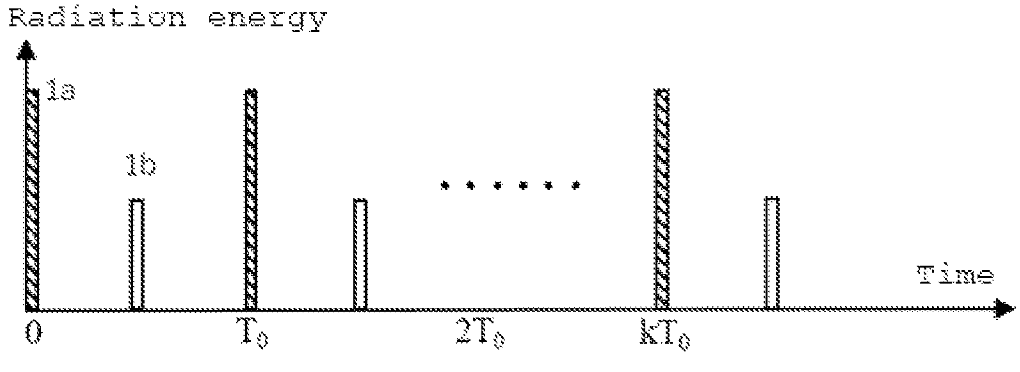
FIG. 8 to FIG. 10 are schematic diagrams of three beam exit time sequences of radiation sources according to some embodiments of the inspection system of the present disclosure.
Figure 9:
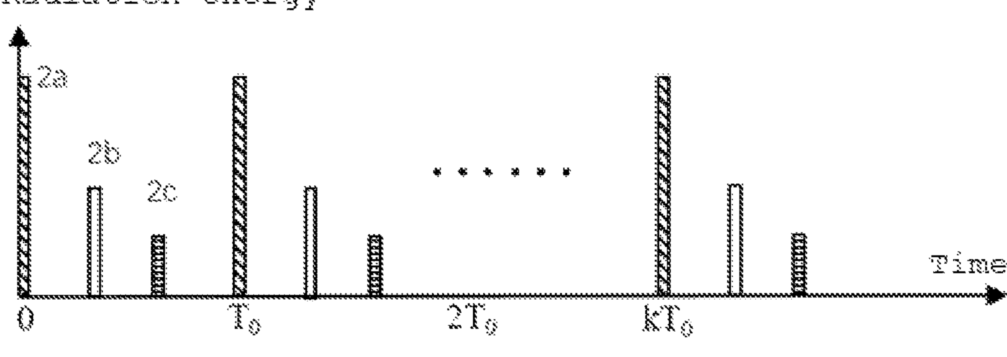
Figure 10:
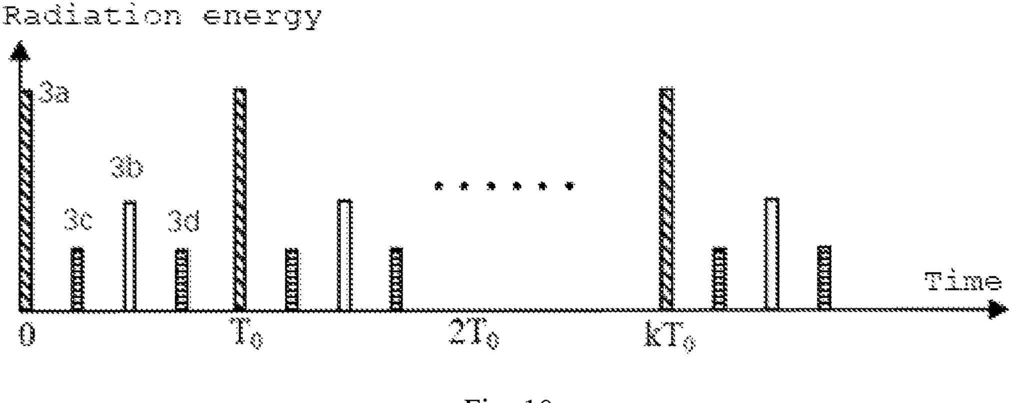

FIG. 8 to FIG. 10 are schematic diagrams of three beam exit time sequences of radiation sources according to some embodiments of the inspection system of the present disclosure. Referring to FIG. 8 to FIG. 10, for the radiation sources capable of realizing multiple radiation energies, different periodic radiation combinations can be formed through radiation pulses having different radiation energies within one fixed scanning period (To). In FIG. 8 to FIG. 10, one scanning period has two radiation pulses, three radiation pulses and four radiation pulses, respectively.

Generally speaking, the X-ray with a higher radiation energy can better recognize a thick material area and a high-Z material area, and the X-ray with a lower radiation energy can better recognize a thin material area and a low-Z material area. Through adjusting the combination manners, the entire image scanning effect can be optimized, and the best image quality can be realized.

A commonly used combination manner can be described through the following forms:

in one scanning period (T), radiation pulses of multiple different radiation energies may exist, and the beam exit timing sequence of each radiation pulse can be described with the following rectangular pulse function:

$$s(t) = E\cdot[\varepsilon(t-t_s)-\varepsilon(t-t_s-\Delta t_s)] = \begin{cases} E, & t_s \le t < t_s+\Delta t_s \\ 0, & \text{else} \end{cases};$$

where $t_s$ represents the initial beam exit time within one scanning period, $\Delta t_s$ is the time interval of a single beam exit and satisfies: $0 \le t_s \le T-\Delta t_s$, $\Delta t_s > 0$, and E represents the energy of the radiation pulse (can represent single energy, and can also represent distribution of a certain energy). The function represents that within a single period, the beam exit time of the radiation pulse is $t_s \sim t_s+\Delta t_s$.

$\varepsilon(x)$ represents a unit step function, and is defined as follows:

$$\varepsilon(x) = \begin{cases} 0, & x < 0 \\ 1, & x \ge 0 \end{cases};$$

where 1 represents beam exit, and 0 represents no beam exit.

For a radiation source, at least two radiation pulses having different radiation energies are included in one scanning period, of course the condition of radiation pulses having the same radiation energy is further included. The whole beam exit state can be described by superimposing the beam exit time sequences of radiation pulses:

$$S(t) = \sum_{i=1}^{N} s_i(t) = \sum_{i=1}^{N} E_i\cdot[\varepsilon(t-t_{si})-\varepsilon(t-t_{si}-\Delta t_{si})];$$

Where N represents the number of radiation pulses within one scanning period ($N \ge 2$), for the ith radiation pulse, the beam exit time is $t_{si} \sim t_{si}+\Delta t_{si}$, and there exist generally only one radiation pulse under the beam exit state at the same moment.

Figure 11:
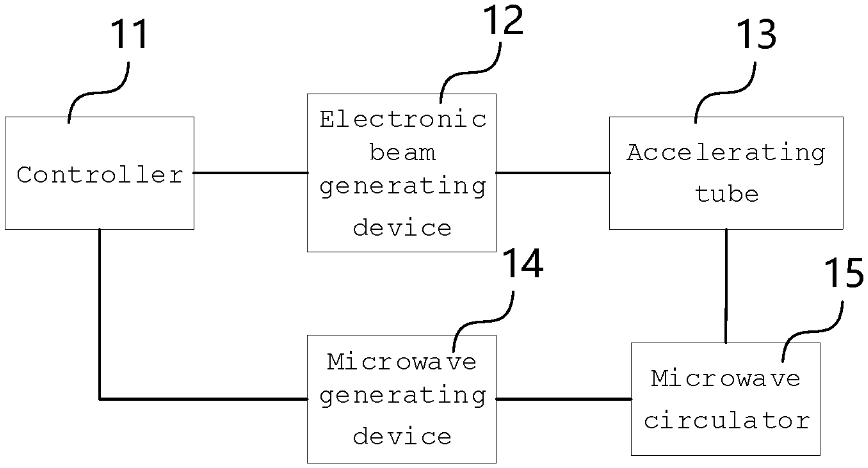
FIG. 11 is a structure diagram of a radiation source in some embodiments according to an inspection system of the present disclosure.

FIG. 11 is a structure diagram of a radiation source in some embodiments according to an inspection system of the present disclosure. Referring to FIG. 11, in some embodiments, the radiation source 10 includes: an electronic beam generating device 12, a microwave generating device 14, a microwave circulator 15, accelerating tubes 13, and a controller 11. The electronic beam generating device 12 is configured to generate electronic beams. In some embodiments, the electronic beam generating device 12 may cause electronic guns to generate electronic beams with the same or different beam loadings, respectively, by means of different high voltage amplitudes generated by a pulse modulator.

The microwave generating device 14 is configured to generate a microwave. In some embodiments, the microwave generating device 14 may generate varying operating currents by means of voltage of different amplitudes output from the pulse modulator, to generate microwave signals of different power. In some other embodiments, the microwave generating device 14 may also generate microwave signals of different power through variations of the magnetic field intensity. The microwave generating device 14 includes a magnetron 141.

The microwave circulator 15 has a power input port and at least two power output ports, and the power input port is connected to the microwave generating device 14 through a waveguide structure. The microwave circulator 15 has isolation characteristics and power allocation characteristics, and can transmit microwave energies along a single direction. By connecting the single microwave generating device 14 to the power input port of the microwave circulator 15, microwave energies fed from the power input port can be allocated to a specific power output port, and reflected microwave energies received by that power output port can be allocated to another power output port. By utilizing such characteristic of the microwave circulator 15 in conjunction with the chronological control of the microwave generating device 14, it is possible to achieve microwave energy output of more than two ports through the microwave generating device 14 as a single microwave power source.

Accelerating tubes 13 are connected to the electronic beam generating device 12, and connected to the at least two power output ports, respectively. Accelerating tubes 13 can receive electronic beams generated by the electronic beam generating device 12, respectively, and accelerate electronic beams respectively through the microwaves received from the at least two power output ports, and to generate rays having different energies, respectively. The accelerated electronic beams may generate rays, such as X-rays, by bombarding a target.

The controller 11 is in signal connection with the electronic beam generating device 12 and the microwave generating device 14, and is configured to perform chronological control on microwave power of the microwave generating device 14, and chronological control on beam loadings of the electronic beams generated by the electronic beam generating device 12 and respectively corresponding to accelerating tubes 13. Through the chronological control performed by the controller 11 on the microwave generating device 14 and the electronic beam generating device 12, accelerating tubes 13 can respectively generate rays of different energies through a microwave power source, and to implement the inspection needs of multi-energy spectrum coverage of an object, and improving the wire resolution indexes of the system while ensuring the penetrability.

Figure 12:
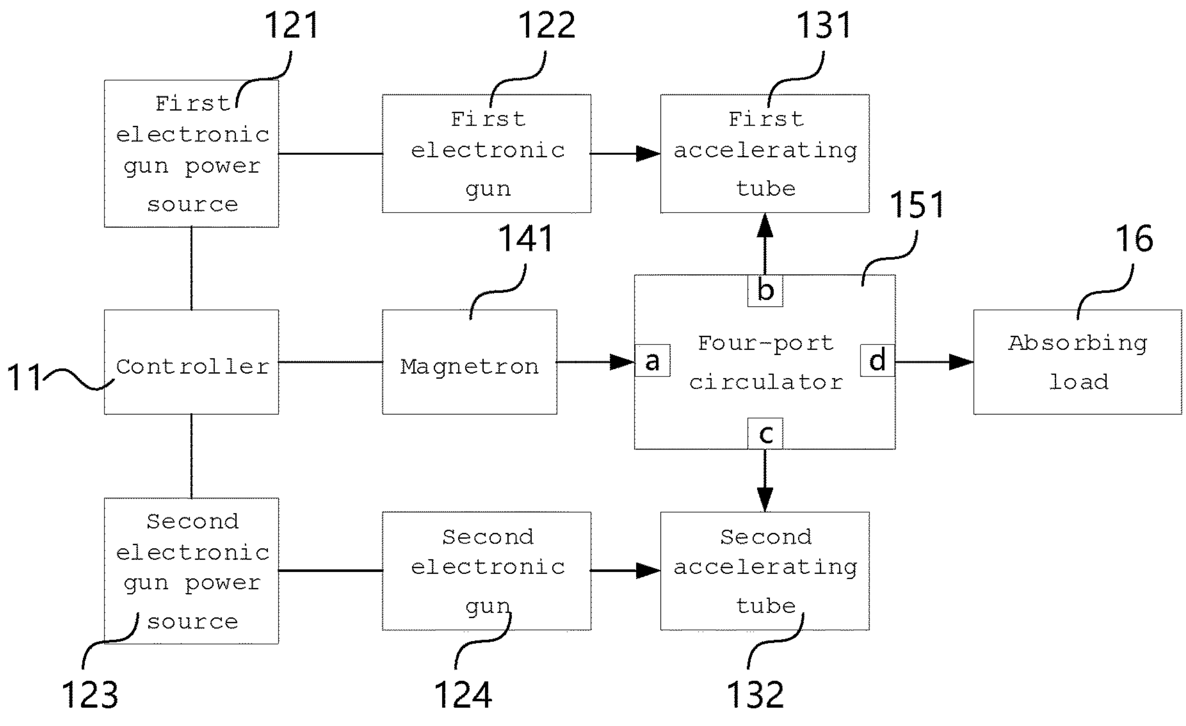
FIG. 12 is a structure diagram of a radiation source in some other embodiments according to an inspection system of the present disclosure.
Figure 13:
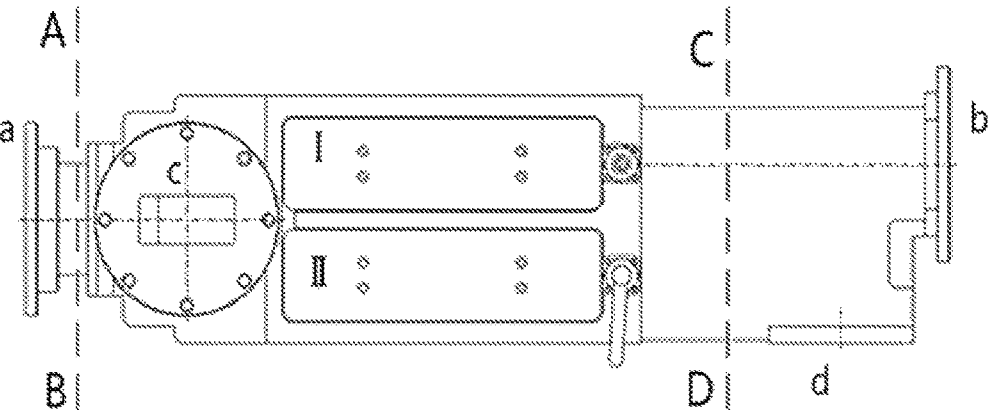
FIG. 13 is a structure diagram of a four-port circulator in some embodiments according to an inspection system of the present disclosure.

FIG. 12 is a structure diagram of a radiation source in some other embodiments according to an inspection system of the present disclosure. FIG. 13 is a structure diagram of a four-port circulator in some embodiments according to an inspection system of the present disclosure. Referring to FIG. 12, in some embodiments, the electronic beam generating device 2 includes a first electronic gun 122, a first electronic gun power source 121, a second electronic gun 124, and a second electronic gun power source 123. The first electronic gun 122 is configured to generate a first electronic beam. The second electronic gun 124 is configured to generate a second electronic beam. Each electronic gun power source and the microwave generating device may be powered by the same AC power source (e.g., 380V).

The first electronic gun power source 121 is in signal connection with the controller 11 and connected to the first electronic gun 122, and is configured to adjust the beam loading of the first electronic beam according to a chronological control signal provided by the controller 11. The second electronic gun power source 123 is in signal connection with the controller 11 and connected to the second electronic gun 124, and is configured to adjust the beam loading of the second electronic beam according to a chronological control signal provided by the controller 11. The controller 11 may adjust voltages applied to the electronic guns by sending a chronological control signal (e.g., pulse width modulation signal) to the electronic gun power sources to further adjust the beam loadings of the electronic beams.

Refer to FIG. 12 and FIG. 13, in some embodiments, at least two power output ports of the microwave circulator 15 include a first power output port b and a second power output port c, the first power output port b is allocated with a microwave signal fed from the power input port a, and the second power output port c is allocated with a microwave signal fed from the first power output port b. The microwave signal fed from the first power output port b may be a reflected microwave signal that is reflected back after being output from the first power output port b.

In FIG. 12, accelerating tubes 13 include a first accelerating tube 131 and a second accelerating tube 132. The first accelerating tube 131 is connected to the first power output port b and the first electronic gun 122, and is configured to accelerate the first electronic beam through a first output microwave signal output by the first power output port b. The second accelerating tube 132 is connected to the second power output port c and the second electronic gun 124, and is configured to accelerate the second electronic beam through a second output microwave signal output by the second power output port c. The accelerated first and second electronic beams may generate X-rays of different energies by bombarding a target.

In some other embodiments, the electronic beam generating device may include more than three electronic guns and corresponding electronic gun power sources thereof, and the ray generating device includes more than three accelerating tubes. Accordingly, the accelerating tubes are connected to more than three power output ports of the microwave circulator, respectively, and to realize output of more types of ray energies through the chronological control of the controller and implement the multi-energy spectrum inspection requirements and multi-viewpoint scanning requirements to the objects.

Referring to FIG. 12, in some embodiments, at least two power output ports of the microwave circulator 15 further include a third power output port d. The third power output port d is allocated with a microwave signal fed from the second power output port c. The microwave signal fed from the second power output port c may be a reflected microwave signal that is reflected back after being output from the second power output port c. The ray generating device may further include an absorbing load 16 connected to the third power output port d. The absorbing load can absorb the microwave signal output from the third power output port d to realize an isolation effect to prevent the microwave signal from returning to the power input port of the microwave circulator.

Referring to FIG. 13, in some embodiments, the microwave circulator 15 includes a four-port circulator 151. The four-port circulator 151 has four ports, which are a power input port a, a first power output port b, a second power output port c and a third power output port d in the power transmission sequence, respectively, that is, the power transmission rule of the four-port circulator 151 is a→b→c→d. In some other embodiments, the microwave circulator 15 may further include a combination structure of three-port circulators and four-port circulators connected in series.

FIG. 13 illustrates the structure of a ferrite four-port circulator. The four-port circulator is a coupled device including a dual-T joint, a nonreciprocal phase shifter based on ferrite field-displacement effect, and a 3 dB coupler. During the operation of the ray generating device, an electromagnetic wave of which the amplitude is $E_0$ is fed from the power input port a. Due to the dual-T (H branch) characteristic, electromagnetic waves with equal amplitude of $E_0/(2^{(1/2)})$ and equal phase will be output from waveguides I and II at side A-B. The nonreciprocal phase shifter can allow phase of the electromagnetic wave in the waveguide I to be 90° ahead relative to that in the waveguide II when the electromagnetic wave is forwardly transmitted from side A-B to side C-D (and conversely, the phase in the waveguide II is 90° ahead relative to the phase in the waveguide I if it is reversely transmitted from side C-D to side A-B), and the 3 dB coupler from side C-D to a location between the first power output port b and the third power output port d can cause the microwave power in the waveguides I and II to be equally divided to the first power output port b and the third power output port d, respectively, but the phase shift is increased by 90° during the coupling transmission, and all microwave power output from the waveguide I and the waveguide II to the first power output port b and the third power output port d, respectively, is output from the first power output port b, but is not output at the third power output port d.

Similarly, the microwave power input from the first power output port b is allocated to the second power output port c for output, and the microwave power input from the second power output port c is allocated to the third power output port d for output. Accordingly, the reflected microwave input from the first power output port b is allocated to the second power output port c for output, and the reflected wave from the second power output port c will be transmitted to the third power output port d and absorbed by the absorbing load.

In some embodiments, the chronological control by the controller 11 causes the first accelerating tube connected to the first power output port b to obtain larger power and energy to output at least one type of X-rays with a higher energy, for example, X-rays with output energies of 6 MeV and 3 MeV; and the chronological control by the controller 11 causes the second accelerating tube connected to the second power output port c to obtain smaller power and energy to output at least one type of X-rays with a lower energy, such as X-rays with output energies of 0.3 to 0.6 MeV. In this way, the effect of power allocation is achieved by differences of the microwave power output from different power output ports of the microwave circulator, and accelerating tubes with different energies can be driven by utilizing the power allocation characteristic of the microwave circulator, and to implement various inspection requirements.

In the above embodiments of the inspection system, the detector 30 can be a dual-energy detector. The dual-energy detector includes a high-energy detector array and a low-energy detector array. The low-energy detector array is configured to detect signals when the radiation pulses having the first radiation energy emitted by the radiation source act on the object. The high-energy detector array is configured to detect signals when the radiation pulses having the second radiation energy and the radiation pulses having the third radiation energy emitted by the radiation source 10 act on the object. The high-energy detector array and the low-energy detector array are turned on alternately within a scanning period, when the radiation source emits the radiation pulse having the first radiation energy, the low-energy detector array is turned on, and the high-energy detector array is turned off, while when the radiation source emits the radiation pulse having the second radiation energy or the third radiation energy, the high-energy detector array is turned on, and the low-energy detector array is turned off, to effectively prevent or reduce interference of the detector 30 on the reception of detection signals when the radiation pulses of different radiation energies act on inspected objects, and improving quality of the obtained scanned images.

Figure 14:
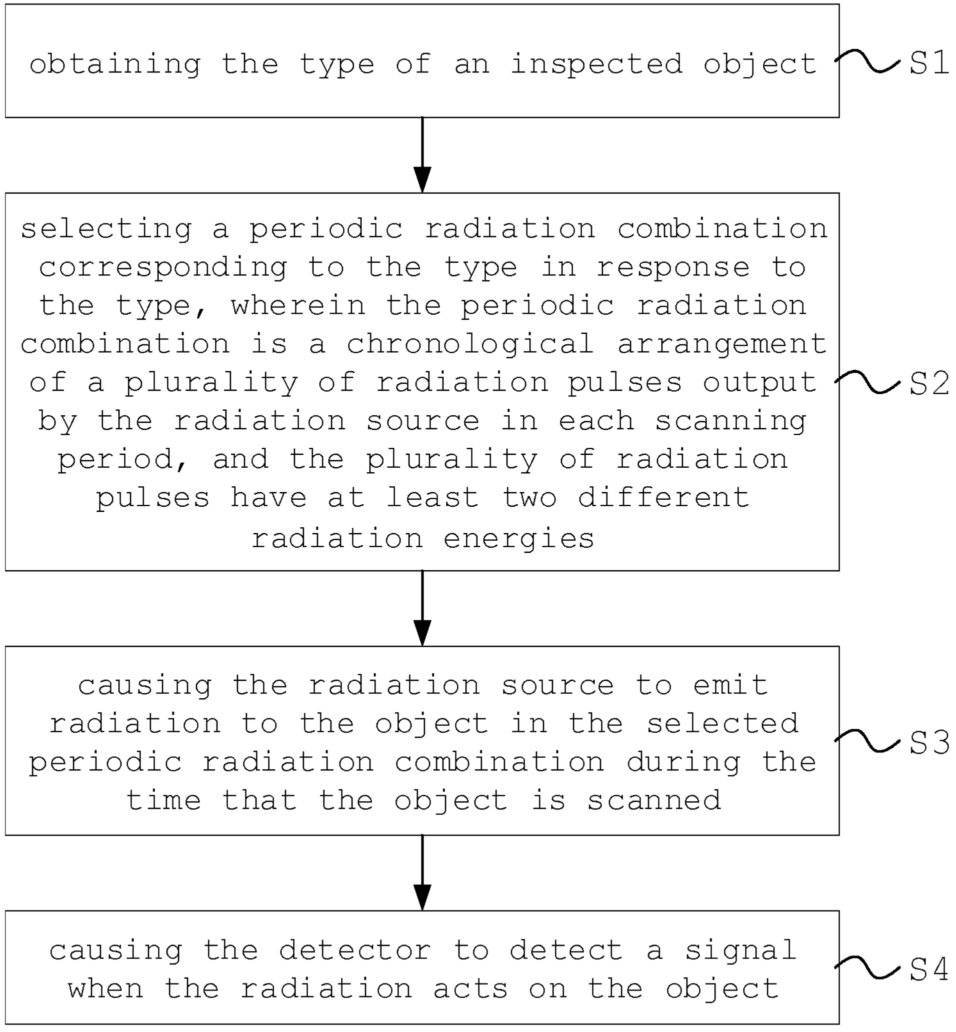
FIG. 14 is a schematic flowchart of some embodiments of the inspection method of the present disclosure.

Based on each embodiment of the above inspection system, the present disclosure further provides an embodiment of the inspection method. FIG. 14 is a schematic flowchart of some embodiments of the inspection method of the present disclosure. Referring to FIG. 14, in some embodiments, the inspection method of the above inspection system includes: step S1 to step S4. In the step S1, the type of an inspected object is obtained. In the step S2, a periodic radiation combination corresponding to the type in response to the type is selected, and the periodic radiation combination is a chronological arrangement of radiation pulses output by the radiation source 10 in each scanning period, and radiation pulses have at least two different radiation energies.

In the step S3, the radiation source 10 is caused to emit radiation to the object in the selected periodic radiation combination during the time that the object is scanned. Step S4, causing the detector 30 to detect a signal when the radiation acts on the object.

In the present embodiment, after obtaining the type of the inspected object, the object is scanned according to the periodic radiation combination corresponding to the type, and the radiation source can reasonably select a proper scanning energy based on the type of the object, to scan inspection for different objects has good adaptability. Moreover, it is not necessary to recognize different parts of the object when this method is adopted, and to select radiation energy according to the different parts, to further simplify control.

In some embodiments, the step of obtaining the type of an inspected object includes: determining the type of the object according to object features in response to the object features sensed by the optical sensing element 51. In some other embodiments, the step of obtaining the type of an inspected object includes: determining the type of the object according to type information in response to the type information input to the human-machine interaction device 52.

Multiple embodiments in the present specification are described in a progressive manner, and each embodiment has different emphasis, while the same or similar parts between each embodiment can be referred to each other. For method embodiments, since the whole and the steps involved are corresponding to the contents of the system embodiments, the description is relatively simple, and for related parts, please refer to part of the description of the system embodiments.

So far, various embodiments of the present disclosure have been described in detail. In order to avoid obscuring concepts of the present disclosure, some details that are well known in the art have not been described.

Although some specific embodiments of the present disclosure have been described in detail through examples, the above examples are only for illustration and are not intended to limit the scope of the present disclosure. The above embodiments can be modified or some features can be replaced by equivalents without departing from the scope and spirit of the present disclosure. The scope of the present disclosure is defined by appended claims.

What is claimed is:

1. An inspection system, comprising:

a radiation source;

a detector configured to detect a signal when radiation emitted by the radiation source acts on an inspected object; and a processor in communication connection with the radiation source and configured to select a periodic radiation combination corresponding to a type of the object according to the type of the object, and cause the radiation source to emit radiation to the object in the selected periodic radiation combination during the time that the object is scanned, wherein the periodic radiation combination is a chronological arrangement of a plurality of radiation pulses output by the radiation source in each scanning period, and the plurality of radiation pulses have at least two different radiation energies;

the at least two different radiation energies comprise a first radiation energy and a second radiation energy, the first radiation energy is less than 1 MeV, and the second radiation energy is greater than 1 MeV; and the object has different types, in the plurality of radiation pulses comprised in periodic radiation combinations corresponding to each of the different types, the numbers of radiation pulses having the first radiation energy are different from each other as between the different types.

2. The inspection system according to claim 1, wherein the at least two different radiation energies further comprise a third radiation energy, and the third radiation energy is greater than the second radiation energy.

3. The inspection system according to claim 2, wherein the detector is a dual-energy detector in communication connection with the processor, the dual-energy detector comprises a high-energy detector array and a low-energy detector array, the low-energy detector array is configured to detect signals when the radiation pulses having the first radiation energy emitted by the radiation source act on the object, and the high-energy detector array is configured to detect signals when the radiation pulses having the second radiation energy and the radiation pulses having the third radiation energy emitted by the radiation source act on the object.

4. The inspection system according to claim 2, wherein in the plurality of radiation pulses comprised in the periodic radiation combinations corresponding to each of the different types, the numbers of the radiation pulses having the second radiation energy are different from each other as between the different types, and/or the numbers of the radiation pulses having the third radiation energy are different from each other as between the different types.

5. The inspection system according to claim 1, wherein the object is a vehicle, the type of the object comprises one of a passenger car type and a truck type, and the number of radiation pulses having the first radiation energy in the periodic radiation combination corresponding to the passenger car type is greater than the number of radiation pulses having the first radiation energy in the periodic radiation combination corresponding to the truck type.

6. The inspection system according to claim 1, wherein the processor is configured to cause the radiation source to scan an entirety of the object in the selected periodic radiation combination.

7. The inspection system according to claim 1, wherein the radiation source comprises:

an electronic beam generating device configured to generate a plurality of electronic beams;

a microwave generating device configured to generate a microwave;

a microwave circulator having a power input port and at least two power output ports, the power input port being connected with the microwave generating device through a waveguide structure;

a plurality of accelerating tubes connected with the electronic beam generating device, respectively connected with the at least two power output ports, configured to respectively receive a plurality of electronic beams generated by the electronic beam generating device, and accelerate the plurality of electronic beams respectively through microwaves received from the at least two power output ports, wherein to respectively generate a plurality of radiation pulses having different radiation energies; and a controller in signal connection with the processor, the electronic beam generating device and the microwave generating device and configured to perform, according to instructions of the processor, chronological control on microwave power of the microwave generating device, and chronological control on beam loadings generated by the electronic beam generating device and respectively corresponding to electronic beams of the plurality of accelerating tubes.

8. The inspection system according to claim 7, wherein the radiation source comprises:

a first electronic gun configured to generate a first electronic beam;

a first electronic gun power source in signal connection with the controller and connected with the first electronic gun and configured to adjust a beam loading of the first electronic beam according to a chronological control signal provided by the controller;

a second electronic gun configured to generate a second electronic beam; and a second electronic gun power source in signal connection with the controller and connected with the second electronic gun and configured to adjust a beam loading of the second electronic beam according to a chronological control signal provided by the controller, wherein the controller is configured to cause the first electronic gun power source to adjust the beam loading of the first electronic beam to be a first beam loading at a first time period in each period of at least one period, and cause the second electronic gun power source to adjust the beam loading of the second electronic beam to be a second beam loading at a second time period in each period, and the first time period does not coincide with the second time period.

9. The inspection system according to claim 8, wherein at least two power output ports of the microwave circulator comprise a first power output port and a second power output port, the first power output port is allocated with a microwave signal fed from the power input port, and the second power output port is allocated with a microwave signal fed from the first power output port; and the plurality of accelerating tubes comprise:

a first accelerating tube connected with the first power output port and the first electronic gun and configured to accelerate the first electronic beam through a first output microwave signal output by the first power output port; and a second accelerating tube connected with the second power output port and the second electronic gun and configured to accelerate the second electronic beam through a second output microwave signal output by the second power output port.

10. The inspection system according to claim 9, wherein at least two power output ports of the microwave circulator further comprise a third power output port which is allocated with a microwave signal fed from the second power output port; and the radiation source further comprises: an absorbing load connected with the third power output port and configured to absorb a microwave signal output by the third power output port.

11. The inspection system according to claim 10, wherein the microwave circulator comprises a four-port circulator.

12. The inspection system according to claim 10, wherein the controller is configured to allow a microwave signal fed by the microwave generating device to the power input port of the microwave circulator to comprise at least one first input microwave signal at the first time period, and to allow the microwave signal fed by the microwave generating device to the power input port of the microwave circulator to comprise at least one second input microwave signal at the second time period, and a power of the at least one first input microwave signal is greater than that of the at least one second input microwave signal.

13. The inspection system according to claim 7, wherein the microwave generating device comprises a magnetron.

14. The inspection system according to claim 1, further comprising:

an optical sensing element in communication connection with the processor and configured to sense an object feature of the object and send the object feature of the object to the processor, such that the processor determines the type of the object according to the object feature; or a human-machine interaction device in communication connection with the processor and configured to receive an input type information and send the input type information to the processor, such that the processor determines the type of the object according to the type information.

15. An inspection method of the inspection system according to claim 1, comprising:

obtaining a type of an inspected object;

selecting a periodic radiation combination corresponding to the type in response to the type, wherein the periodic radiation combination is a chronological arrangement of a plurality of radiation pulses output by the radiation source in each scanning period, and the plurality of radiation pulses have at least two different radiation energies;

causing the radiation source to emit radiation to the object in the selected periodic radiation combination during the time that the object is scanned; and causing the detector to detect a signal when the radiation acts on the object.

16. The inspection method according to claim 15, wherein the step of obtaining a type of an inspected object comprises:

determining the type of the object according to an object feature in response to the object feature sensed by an optical sensing element; or determining the type of the object according to type information in response to the type information input to a human-machine interaction device.

* * * * *